United States Patent

Ancona

[15] 3,676,655
[45] July 11, 1972

[54] DIGITAL FUNCTION GENERATOR FOR TWO INDEPENDENT VARIABLES WITH INTERPOLATION

[72] Inventor: Anthony Ancona, Hartford, Conn.

[73] Assignee: Chandler Evans Inc., West Hartford, Conn.

[22] Filed: July 31, 1970

[21] Appl. No.: 60,001

[52] U.S. Cl............................................235/152, 235/197
[51] Int. Cl........................................................G06f 15/34
[58] Field of Search................235/152, 150.53, 151.11, 197

[56] References Cited

UNITED STATES PATENTS

| | | | |
|---|---|---|---|
| 3,247,365 | 4/1966 | Dell et al............................ | 235/152 X |
| 3,373,273 | 3/1968 | Schubert.......................... | 235/150.53 X |
| 3,412,240 | 11/1968 | Hunt et al........................... | 235/152 X |

Primary Examiner—Malcolm A. Morrison
Assistant Examiner—David H. Malzahn
Attorney—Fishman and Van Kirk

[57] ABSTRACT

A digital logic circuit for providing an output signal which is a function of a pair of independent variables is disclosed. The disclosed embodiment includes a two-dimensional function generator which operates as a pulse packet analyzer; the two-dimensional function generator providing a binary output signal which is an arbitrary function of a third variable with respect to the actual value of a first variable and a known value of a second variable. The disclosed embodiment also includes circuitry for interpolating the regions between curves as represented by the output of the two-dimensional function generator, as a function of the difference between the actual and known values of the second independent variable, in order to provide a binary signal which may be added to the two-dimensional function generator output to produce the desired output signal.

12 Claims, 3 Drawing Figures

INVENTOR
ANTHONY ANCONA

DIGITAL FUNCTION GENERATOR FOR TWO INDEPENDENT VARIABLES WITH INTERPOLATION

BACKGROUND OF THE INVENTION

1. Field of the Invention

The present invention relates to the electrical simulation of non-linear functions. More specifically, the present invention is directed to arbitrary function generators and particularly to function generators which employ digital circuit techniques to produce an output signal which is an arbitrary function of two input signals. Accordingly, the general objects of the present invention are to provide novel and improved methods and apparatus of such character.

2. Description of the Prior Art

While not limited thereto in its utility, the present invention is particularly well suited for use in electronic fuel control systems for combustion engines; particularly for gas turbine engines. As is well known, a fuel control for a gas turbine engine must provide for the scheduling of fuel flow on a non-linear basis in response to the levels of a plurality of variable engine operating parameters under certain operating conditions. For example, it is well known that an arbitrary relationship exists between the independent variables of gas generator speed and engine inlet temperature and the maximum permissible fuel delivery rate for a gas turbine engine. Accordingly, engine manufacturers plot families of curves which define maximum fuel flow rate as a function of inlet temperature and gas generator speed; such curves being known in the art as fuel flow schedules which cannot be exceeded for safe operation.

The conventional prior art fuel control for a gas turbine engine was a mechanical or electromechanical device which employed three-dimensional cams machined in accordance with the "schedules" provided by the engine manufacturer. Thus, to produce a signal representative of an arbitrary function of a pair of independent variables, prior art devices have incorporated a mechanical cam with its associated cam follower. These mechanical and electro-mechanical arrangements produced either a mechanical output or an analog electrical signal representative of the maximum permissible rate of fuel flow for the existing values of gas generator speed and engine inlet temperature. The disadvantages of mechanical and electric analog systems when compared to digital systems for generating the same output information are many and are well known in the art. Accordingly, it has long been desired to produce a "three-dimensional" electrical function generator employing digital circuit techniques.

As will be obvious, in order to realize the accuracy normally considered inherent in digital computation, a "three-dimensional" function generator must have interpolation capability in order to permit the generation of signals commensurate with regions between the "schedules" supplied by the manufacturer of the equipment to be controlled. Digital systems with such an interpolation capability have not previously been available.

SUMMARY OF THE INVENTION

The present invention overcomes the above and other disadvantages of the prior art by providing a novel pulse packet analyzer, three-dimensional, function generator which employs digital circuit techniques. In accordance with the invention, input pulse packets commensurate with a first independent variable and a binary signal commensurate with a second independent variable are loaded into respective counters. The outputs or counts recorded in both counters are applied to a pair of storage devices whereby each storage device is supplied with the values of the two variables. The first of these storage devices, which functions as an encoder, has information previously recorded therein which is commensurate with a family of curves representing the variations in a third variable with respect to the first variable for values of the second variable. The output of the first storage device, accordingly, is information commensurate with one of the curves of said family. This information controls the logic of an arbitrary function generator whereby the function generator will produce output pulses commensurate with the selected curve. These output pulses are delivered to an output counter which counts up the selected curve until the point on that curve as determined by the value of the first variable is reached.

The second storage device provides information commensurate with the partial derivative of the third variable with respect to the second variable. This information is interpolated, in a third storage device which functions as a multiplier, to provide information commensurate with incremental values of the third variable which must be added to the data already loaded into the output counter to generate a point commensurate with the actual value of the third parameter. The signal commensurate with this incremental change in the third variable is employed to generate a signal which control the gating of pulses to the output counter.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

Figure 2:
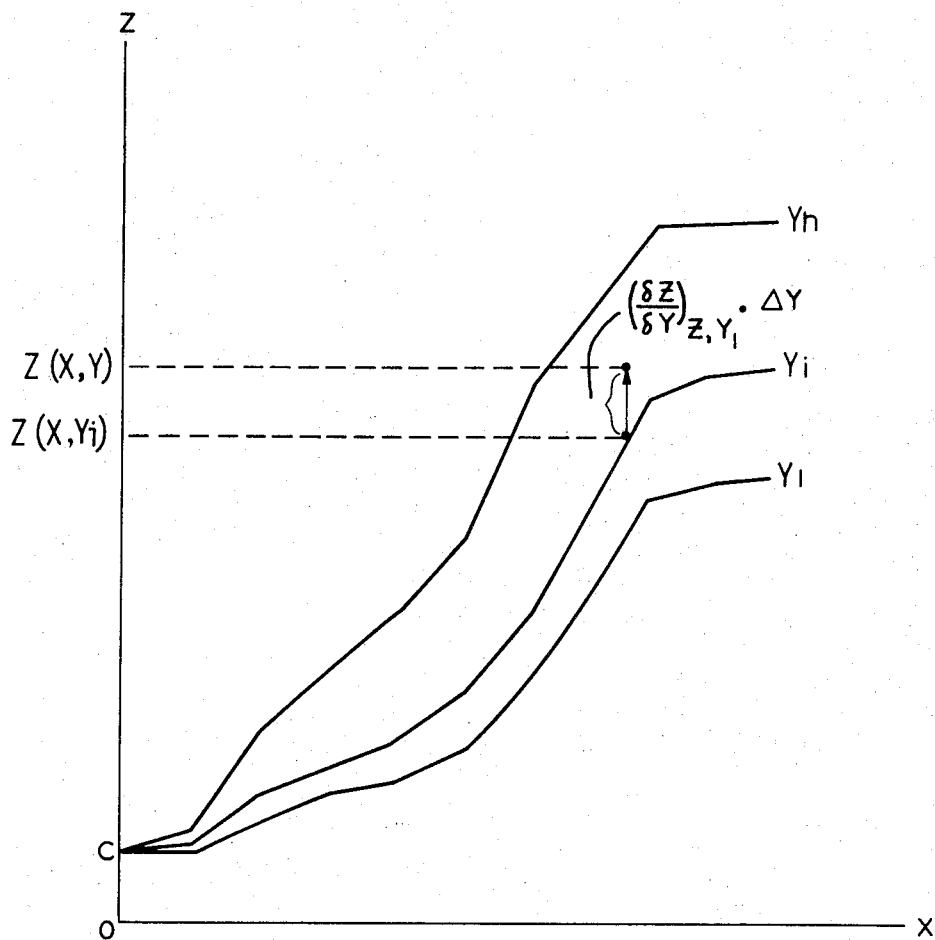
FIG. 2 is a graphical representation which facilitates understanding of the operation of the embodiment of FIG. 1, FIG. 2 depicting a family of Y curves projected in the X, Z plane of a X, Y, Z three-dimensional system.

DESCRIPTION OF THE PREFERRED EMBODIMENT:

Referring initially to FIG. 2, it is to be observed that a three-dimensional function can be generated from a family of Y curves projected in the X, Z plane of an X, Y, Z three-dimensional system. The foregoing is accomplished by integrating up on a selected Y curve, the $Y_i$ curve in FIG. 2, to the $Z(X, Y_i)$ point and then adding:

$$\left(\frac{\delta Z}{\delta Y}\right) Z, Y \cdot \Delta Y \qquad (1)$$

where $\Delta Y = (Y - Y_i)$

The ability to accomplish the foregoing integration presumes that signals commensurate with points on the family of $Y$ curves, such curves being arbitrary functions of known values of X and Z, may be generated. As will be described in greater detail below, a "two-dimensional" function generator suitable for use in generating the family of $Y$ curves of FIG. 2 by digital circuit techniques is available.

Figure 1:
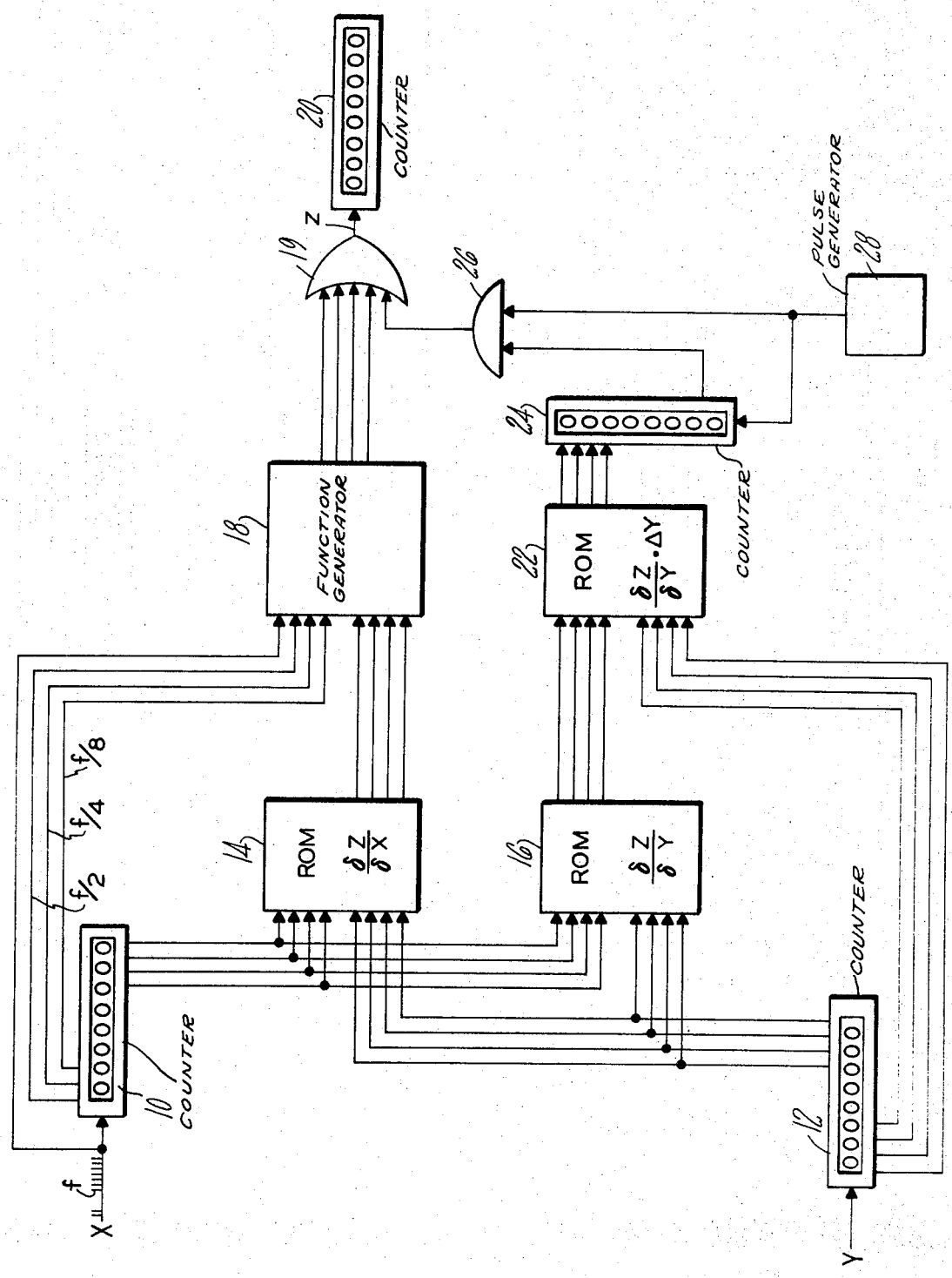
FIG. 1 is a functional block diagram of a preferred embodiment of the present invention.

With reference now to FIG. 1, pulse packets comprising a number of evenly spaced pulses are delivered to a counter 10. The number of pulses in each packet will be commensurate with the magnitude of a first sensed independent variable. A signal, in binary form, commensurate with a second sensed variable parameter is applied in serial form to counter 12. Counter 10, which may be considered the X counter, will be a binary counter having the necessary capacity. A typical 16-bit counter which may be employed in the present invention comprises four Signetics Corporation Type S8281 four bit binary counters suitably interconnected. Counter 12, which may be considered the Y counter, will be identical to counter 10 but may have less capacity. Both of counters 10 and 12 have parallel read out and the most significant bits of counter 10 are delivered as inputs to a pair of read only memories 14 and 16. Similarly, the most significant bits of counter 12 are also delivered to read only memories 14 and 16.

As is well known in the art, a read only memory is a storage element having information permanently recorded or "burned" into the memory. Upon interrogation, the read only memory will provide output information commensurate with the relationship between the input signals and the stored data. Memories 14 and 16 of the present invention may, for example, comprise National Semiconductor, Inc. Type MM 423 devices which are 2,048 bit read only memories. Memory 14 will have stored therein information corresponding to the partial derivative of the variable Z with respect to X ($\delta Z/\delta X$) at particular values of Y. Considering the example situation wherein the present invention is employed in a fuel control for a gas turbine engine, the variable X will be gas generator speed, the variable Y will be inlet temperature and the information stored in memory 14 will be the rate of change of fuel flow Z with respect to speed at a plurality of inlet temperatures; the foregoing information being provided by the manufacturer of the engine. Accordingly, when interrogated, memory 14 will provide output information relative to the slope of the "third dimension." Memory 16 will have stored therein information, also furnished by the controlled apparatus manufacturer, corresponding to the partial derivative ($\delta Z/\delta Y$) of Z (fuel flow) with respect to Y (inlet temperature).

The least significant bits of counter 10 are connected to a "two-dimensional" arbitrary function generator 18 and provide, at the input to function generator 18, a plurality of signals comprising pulses at different frequencies. Restated, considering the embodiment shown in FIG. 1, the input to counter 10 and the three least significant bits of the counter are connected as inputs to function generator 18 and the three stages of counter 10 thus serve the dual function of counter stages and portions of a frequency divider comprised of series connected bistable circuits. This dual use of a binary counter is a technique well known in the art.

The output generated as a result of the interrogation of read only memory 14 is applied, as the control input, to function generator 18. As will be described in greater detail below, in response to the control signal from memory 14, function generator 18 will generate a particular Y curve. Restated, the curve slope information output from read only memory 14 determines the particular two-dimensional function which will be generated by circuit 18 and, in response to the pulses at four different frequencies delivered to circuit 18 from counter 10, circuit 18 will provide output signals commensurate with the selected Y curve. Function generator 18 will typically be a digital function generator of the type shown and described in copending application Ser. No. 50,212, filed June 26, 1970 by Ronald E. Falk and assigned to the same assignee as the present invention.

The output of function generator 18 will be a series of pulses which are loaded, via a summing OR gate 19, into an output counter 20. Accordingly, considering the condition wherein there is no necessity to interpolate between Y curves, counter 20 will count up along the selected one of the family of Y curves to a point determined by the two input signals which are commensurate with the sensed variable parameters.

The output signal produced as a result of the interrogation of read only memory 16 is delivered as an input to a third read only memory 22. Memory 22 may be identical to memories 14 and 16 and will have, permanently stored therein, information commensurate with the product of the partial derivative of Z with respect to $$\Delta Y \left( \frac{\delta Z}{\delta Y} \cdot \Delta Y \right).$$

Read only memory 22 thus performs a multiplication function in response to the $\Delta Y$ information, which is read directly from the least significant bits of counter 12, and the partial derivative of Z with respect to Y information, which is read out of memory 16. As is well known, such a multiplication constitutes an interpolation.

The output signal provided by the interrogation of read only memory 22 is loaded, in parallel fashion, into a binary counter 24. Read only memory 22 will deliver a negative output to counter 24 which is commensurate with the interpolative value of $\Delta Z$ between a pair of Y curves of FIG. 2. The manner in which the output of memory 22 is strobed into counter 20 will be described below.

The most significant bit of counter 24, which will be in the "0" state prior to the loading of information into the counter from memory 22, is connected as the first or control input to normally closed AND gate 26. High frequency pulses from the source 28 are applied to the serial input of counter 24 and to the second input of gate 26. Once $\Delta Z$ information has been transferred into counter 24, an enabling signal will be applied to gate 26 from counter 24 until such time as the pulses loaded serially into counter 24 cause this counter to be counted up to zero; the counter thereupon being filled and the enabling signal being removed from gate 26. During the period that gate 26 is enabled, pulses from source 28 will be passed to counter 20 via summing gate 19 wherein they will be summed with the output pulses supplied to counter 20 by function generator 18. While not essential, it is considered desirable to employ, for pulse source 28, a synthesizer which will operate from the source of X input pulses to insure that the pulses passed through gate 26 may be interleaved with the output pulses provided by function generator 18.

To summarize, considering simultaneously FIGS. 1 and 2, as the X input pulses are being counted, the function generator 18 is generating Z pulses to thereby produce the $Y_i$ curve until the Z ($X, Y_i$) point is reached. This will occur at the end of each sampling period during which a packet of X pulses is delivered to counter 10. Simultaneously, $$\frac{\delta Z}{\delta Y} \cdot \Delta Y$$

is looked up in read only memories 16 and 22 and, in the interval between sampling periods, the incremental change $\Delta Z$ will be serially added to the binary output signal provided by function generator 18 whereby counter 20 will indicate the proper $Z(X,Y)$ value.

Figure 3:
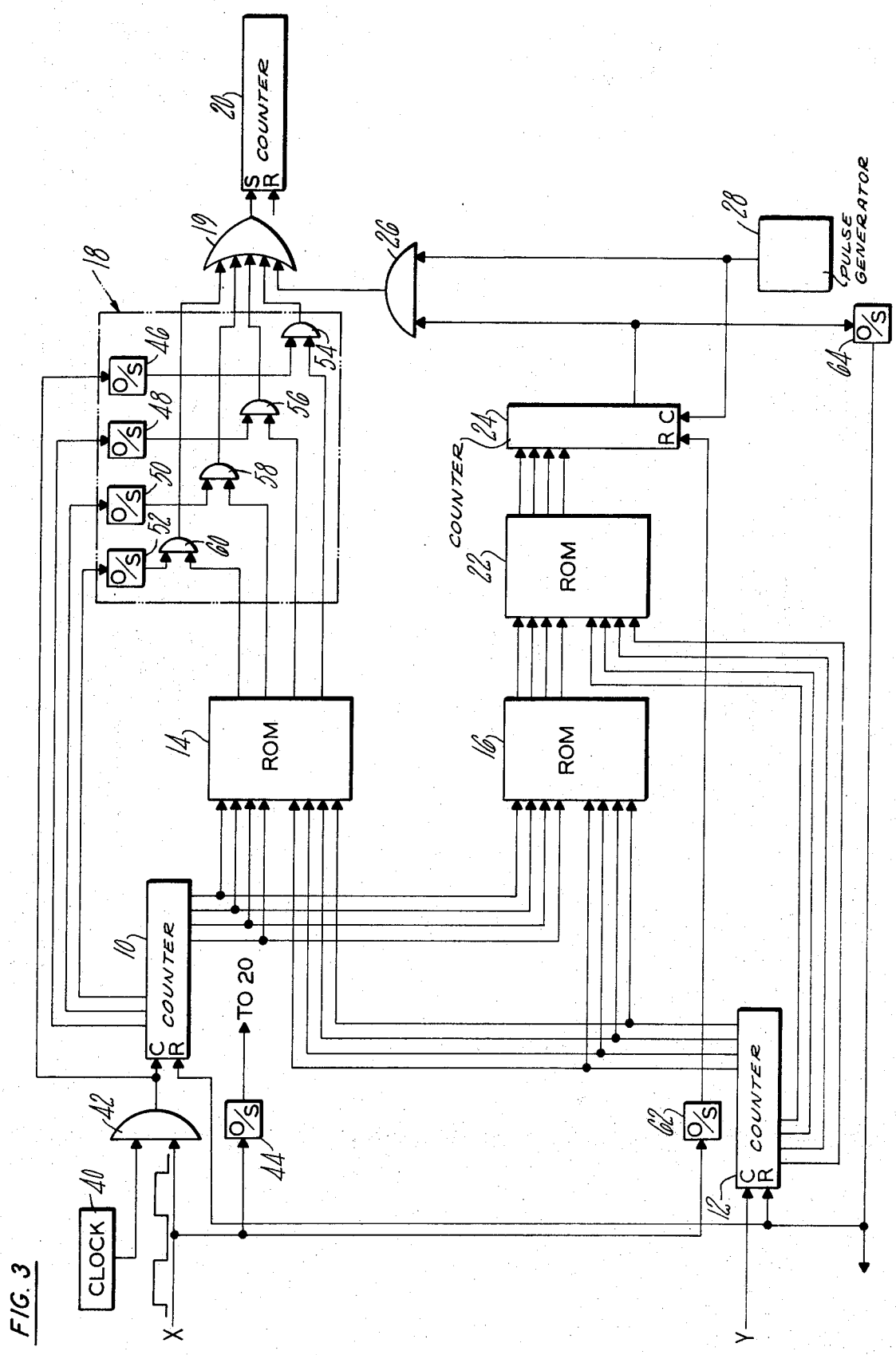
FIG. 3 is an electrical circuit block diagram of the embodiment of FIG. 1.

The preferred embodiment of FIG. 1 is shown in more detail in FIG. 3. An input signal commensurate with the independent variable X will be applied to a first input of AND gate 42. The input will typically be a pulse width modulated signal; the duration of the input pulses being related to the magnitude of the sensed parameter. A high-frequency pulse train generated by an oscillator or clock 40 is applied to the second input of gate 42. Accordingly, gate 42 will pass a packet of pulses from clock 40 during periods when an input signal pulse is applied thereto; the number of pulses in each packet being proportional to the instantaneous value of gas generator speed in the turbine engine fuel control application.

The pulse width modulated input signals are also applied to an astable multivibrator 44. Multivibrator 44 is responsive to the leading edge of each input pulse and generates reset pulses which are applied to the reset terminal of counter 20. The resetting of counter 10 is achieved, in the manner to be described below, in the interval between successively received input pulses.

As noted above, the first three stages or least significant bits of counter 10 serve the dual functions of counter stages and portions of a frequency division circuit. Accordingly, the output signal from gate 42 as well as the first three stages of counter 10 are respectively connected to one shot multivibrators 46, 48, 50 and 52 in function generator 18. The use of astable multivibrators 46, 48, 50 and 52 is in the interest of insuring that the output pulses resulting from the division of the input pulse train will be displaced in time from one another. Thus, the one shot multivibrators provide against overlapping in time of the pulses resulting from the switching of the first three stages of counter 10. The four astable multivibrators, in turn, provide sources of pulses at four different frequencies which are respectively applied at first inputs to AND gates 54, 56, 58, and 60 of function generator 18. Each of these AND gates has its second or enabling input connected to a respective output of read only memory 14. Thus, the read only memory 14 functions as an encoder which determines which one or combination of gates 54, 56, 58 and 60 will pass pulses at the four different applied frequencies. The input to memory 14 will vary during a sampling period as counter 10 is filled and thus the output of the read only memory will also vary. Depending on the value of the Y input, memory 14 will provide output signals which vary the state of AND gates 54, 56, 58 and 60 whereby the selected Y curve will be followed until the point $Z(X, Y_i)$ is reached at the end of a sampling period. For a further discussion of the operation of function generator 18, reference may be had to aforementioned copending application Ser. No. 50,212 and particularly to the description of FIG. 4 thereof.

The X pulse width modulated input signals are also applied to a further astable multivibrator 62. Multivibrator 62 is responsive to the trailing edge of each input pulse and generates reset pulses which are applied to the reset terminal of counter 24. As previously noted, after each interpolation counter 24 is filled whereby an output signal of the proper polarity to disable gate 26 will be provided at the zero stage (most significant bit) of counter 24. The resetting of counter 24 at the trailing edge of each sampling period will clear this counter and simultaneously strobe the most recent value of $$\frac{\delta Z}{\delta Y} \cdot \Delta Y,$$

as provided at the output of read only memory 22, into the counter. The resetting of counter 24 will also remove the disabling signal from gate 26 whereby pulses from source 28 will be loaded into counter 20 via gates 26 and 19. Thus, after the function generator 18 has caused counter 20 to be counted up to the $Z(X, Y_i)$ level, gate 26 will be opened and additional counts commensurate with $\Delta Z$ will be added to the count in counter 20 whereby the counter will be counted up to the $Z(X,Y)$ point.

When counter 24 again counts up to zero, the disabling output will be reapplied to the control terminal of gate 26. This gate control signal will also be applied to further astable multivibrator 64. Multivibrator 64 generates reset pulses which are applied to the reset terminals of counters 10 and 12. The clearing of counters 10 and 12 thus occurs in the interval between receipt of the pulse width modulated X pulses. The reset signals for counter 12 are also applied to circuitry, known in the art and thus not shown herein, which will cause read out of apparatus which senses the Y parameter and the most recent value of the Y parameter will thus be loaded into counter 12 prior to the receipt of the next successive pulse commensurate with the variable X. The Y variable will typically not change rapidly or in stepwise fashion and thus it is not necessary to update the information in counter 12 during each sampling of the X variable.

While a preferred embodiment of the present invention has been shown and described, various substitutions and modifications can be made thereto without departing from the spirit and scope of this invention. Accordingly, it is to be understood that the present invention has been described by way of illustration and not limitation.

What is claimed is:

1. A digital function generator comprising:
    first means responsive to input signals commensurate with actual values of first and second independent variables for generating a first control signal commensurate with the partial derivative of a third variable with respect to the first variable;
    second means responsive to said input signals commensurate with the actual values of the first and second independent variables for generating a second control signal commensurate with the partial derivative of the third variable with respect to the second variable;
    means providing a plurality of signals at different pulse repetition rates;
    means responsive to said first control signal and said plurality of pulsating signals for generating a first output signal commensurate with the value of the third variable with respect to the first variable for the actual value of the first variable and a predetermined value of the second variable;
    means responsive to said input signal commensurate with the actual value of the second variable for generating a signal commensurate with the difference between the actual value of the second variable and a preselected value of the second variable;
    means responsive to said second control signal and said difference signal for generating a second output signal commensurate with the difference between the value of said third variable as represented by said first output signal and the value of said third variable as a function of the actual value of said second variable; and
    means for summing said first and second output signals.

2. The apparatus of claim 1 wherein said means for generating a first control signal commensurate with partial derivatives of the third variable with respect to the first variable comprises:
    a first storage device having information corresponding to known variations of the third variable with respect to the first variable for preselected variables of the second variable permanently recorded therein, said first control signal varying as the value of the first variable changes.

3. The apparatus of claim 2 wherein said means for generating a second control signal commensurate with partial derivatives of the third variable with respect to the second variable comprises:
    a second storage device having information corresponding to known variations of the third variable with respect to the second variable for values of the first variable permanently recorded therein.

4. The apparatus of claim 3 wherein said means for generating a first output signal comprises:
    logic circuit means responsive to said first control signal for passing preselected of said signals at different pulse repetition rates, said output signal pulse repetition rate varying with the first independent variable in accordance with a known function of said third variable with respect to said first variable.

5. The apparatus of claim 4 wherein said means for generating a second output signal comprises:
    means for multiplying the said second control signal by said signal commensurate with the difference between the actual value of said second variable and a preselected value of said second variable, said multiplying means interpolating the difference between known functions of said third variable as represented by said first output signal.

6. The apparatus of claim 5 wherein said multiplying means comprises:
    data storage means having information commensurate with the product of the partial derivative of said third variable with respect to said second variable and the difference between actual and known values of said second variable permanently stored therein.

7. The apparatus of claim 5 wherein said means for generating a first control signal further comprises:
    means responsive to pulse width modulated input signals commensurate with the first variable for generating pulse packets;
    first counter means for totalizing the pulses comprising each packet, the number in said counter means being delivered as an input to said first storage device; and
    means for clearing said counter means in the intervals between receipt of successive input signals.

8. The apparatus of claim 7 wherein said means for summing said first and second output signals comprises:
    second counter means for totalizing pulses delivered thereto;
    means for supplying the pulses at different frequencies passed by said logic circuit means to said second counter means; and
    means for delivering said second output signal to said second counter means.

9. The apparatus of claim 8 wherein said multiplying means comprises:
   a third data storage device having information commensurate with the product of the partial derivative of said third variable with respect to said second variable and the difference between actual and known values of said second variable permanently stored therein;
   pulse generator means connected to said third data storage device for providing a pulse packet commensurate with said product, the number of pulses in each packet being a function of the multiplication performed by said storage device; and
   means for interrogating said pulse generator means after said logic circuit means output signals have been loaded into said second counter means, said pulse generator means output pulses being loaded into said second counter means via said delivering means.

10. The apparatus of claim 9 wherein said pulse generator means comprises:
   third counter means connected to the output of said third data storage device, said third counter means being cleared and reloaded with the output of said storage device under the control of said interrogating means;
   gate circuit means, said gate circuit normally being in a closed state and having its control input connected to a preselected stage of said third counter means;
   free running oscillator means, said oscillator means providing pulses at a selected frequency to said counter means and to said gate means, clearing of said counter means removing the disabling input from said gate circuit means whereby said oscillator means output pulses will be passed to said delivering means until a sufficient number of said oscillator means pulses have been added to the number loaded in said third counter means from said third storage device to fill said third counter means to said preselected stage.

11. A method of electrically simulating an arbitrary function for a variable Z with respect to a pair of independent variables X and Y comprising the steps of:
   generating a first binary signal commensurate with a first arbitrary function of Z with respect to the actual value of X and a known value of Y;
   providing a signal commensurate with the partial derivative of Z with respect to the actual value of Y for the actual value of X;
   multiplying the partial derivative by the difference between the actual value of Y and the known value of Y;
   generating a second binary signal commensurate with the product of said multiplication; and
   summing said first and second binary signals.

12. The method of claim 11 wherein the step of providing a signal commensurate with the partial derivative of Z with respect to Y comprises:
   employing the actual values of X and Y to look up the partial derivative in a memory device having data with respect to the values of Z stored therein.

* * * * *